(12) United States Patent
Wang et al.

(10) Patent No.: US 12,256,384 B2
(45) Date of Patent: Mar. 18, 2025

(54) CONFIGURING SIDELINK TRANSMISSION CONFIGURATION INDICATOR STATES

(71) Applicant: QUALCOMM Incorporated, San Diego, CA (US)

(72) Inventors: Hua Wang, Basking Ridge, NJ (US); Sony Akkarakaran, Poway, CA (US); Tao Luo, San Diego, CA (US); Junyi Li, Fairless Hills, PA (US); Yan Zhou, San Diego, CA (US); Hong Cheng, Basking Ridge, NJ (US); Jelena Damnjanovic, Del Mar, CA (US); Peter Gaal, San Diego, CA (US); Jung Ho Ryu, Fort Lee, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 428 days.

(21) Appl. No.: 17/451,203

(22) Filed: Oct. 18, 2021

(65) Prior Publication Data

US 2023/0123886 A1   Apr. 20, 2023

(51) Int. Cl.
*H04W 72/20*   (2023.01)
*H04L 5/00*   (2006.01)

(52) U.S. Cl.
CPC ........... *H04W 72/20* (2023.01); *H04L 5/0048* (2013.01)

(58) Field of Classification Search
None
See application file for complete search history.

(56) References Cited

U.S. PATENT DOCUMENTS

| 11,050,543 B1 | 6/2021 | Balasubramanian et al. |
| 2020/0022089 A1* | 1/2020 | Guo ...................... H04W 24/08 |
| 2020/0374858 A1* | 11/2020 | Vargas ................. H04B 7/0617 |
| 2020/0396720 A1 | 12/2020 | Li et al. |
| 2021/0099265 A1* | 4/2021 | Shin .................. H04W 72/0453 |
| 2021/0289419 A1* | 9/2021 | Hosseini ............... H04L 1/0007 |
| 2022/0046458 A1* | 2/2022 | Zhu ........................ H04L 5/0048 |
| 2022/0094499 A1* | 3/2022 | Wang .................... H04B 7/0639 |
| 2023/0040590 A1* | 2/2023 | Manolakos ........... H04W 24/10 |
| 2023/0112798 A1* | 4/2023 | Lee ........................ H04W 76/28 370/329 |
| 2023/0209476 A1* | 6/2023 | Kim ....................... H04W 52/36 370/311 |
| 2023/0262512 A1* | 8/2023 | Zhang ............... H04W 28/0268 370/315 |
| 2023/0353987 A1* | 11/2023 | Babaei .................... H04W 4/06 |

FOREIGN PATENT DOCUMENTS

| EP | 4050810 A1 | 8/2022 |
| WO | 2020213986 A1 | 10/2020 |
| WO | 2021101196 A1 | 5/2021 |

OTHER PUBLICATIONS

International Search Report and Written Opinion—PCT/US2022/078007—ISA/EPO—Jan. 25, 2023.

* cited by examiner

*Primary Examiner* — Phuoc H Nguyen
(74) *Attorney, Agent, or Firm* — QUALCOMM Incorporated

(57) ABSTRACT

In some implementations, a user equipment (UE) may transmit, to a second UE, sidelink configuration information indicating one or more transmission configuration indicator (TCI) states for at least one sidelink channel between the first UE and the second UE.

30 Claims, 11 Drawing Sheets

900 →

910 — Transmit, to a second UE, sidelink configuration information indicating one or more transmission configuration indicator (TCI) states for at least one sidelink channel between the first UE and the second UE

FIG. 9

CONFIGURING SIDELINK TRANSMISSION CONFIGURATION INDICATOR STATES

FIELD OF THE DISCLOSURE

Aspects of the present disclosure generally relate to wireless communication and to techniques and apparatuses for configuring sidelink transmission configuration indicator (TCI) states.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first user equipment (UE). The method may include transmitting, to a second UE, sidelink configuration information indicating one or more transmission configuration indicator (TCI) states for at least one sidelink channel between the first UE and the second UE.

Some aspects described herein relate to a method of wireless communication performed by a first UE. The method may include receiving, from a second UE, sidelink configuration information indicating one or more transmission configuration TCI states for at least one sidelink channel between the first UE and the second UE.

Some aspects described herein relate to a first UE for wireless communication. The first user equipment may include a memory and one or more processors coupled to the memory. The one or more processors may be configured to transmit, to a second UE, sidelink configuration information indicating one or more transmission configuration TCI states for at least one sidelink channel between the first UE and the second UE.

Some aspects described herein relate to a first UE for wireless communication. The first UE may include a memory and one or more processors coupled to the memory. The one or more processors may be configured to receive, from a second UE, sidelink configuration information indicating one or more transmission configuration TCI states for at least one sidelink channel between the first UE and the second UE.

Some aspects described herein relate to a non-transitory computer-readable medium that stores a set of instructions for wireless communication by a first UE. The set of instructions, when executed by one or more processors of the UE, may cause the UE to transmit, to a second UE, sidelink configuration information indicating one or more transmission configuration TCI states for at least one sidelink channel between the first UE and the second UE.

Some aspects described herein relate to a non-transitory computer-readable medium that stores a set of instructions for wireless communication by a first UE. The set of instructions, when executed by one or more processors of the first UE, may cause the first UE to receive, from a second UE, sidelink configuration information indicating one or more transmission configuration TCI states for at least one sidelink channel between the first UE and the second UE.

Some aspects described herein relate to an apparatus for wireless communication. The apparatus may include means for transmitting, to a UE, sidelink configuration information indicating one or more transmission configuration TCI states for at least one sidelink channel between the apparatus and the UE.

Some aspects described herein relate to an apparatus for wireless communication. The apparatus may include means for receiving, from a UE, sidelink configuration information indicating one or more transmission configuration TCI states for at least one sidelink channel between the apparatus and the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 9 and 10 are diagrams illustrating example processes associated with configuring sidelink transmission configuration, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
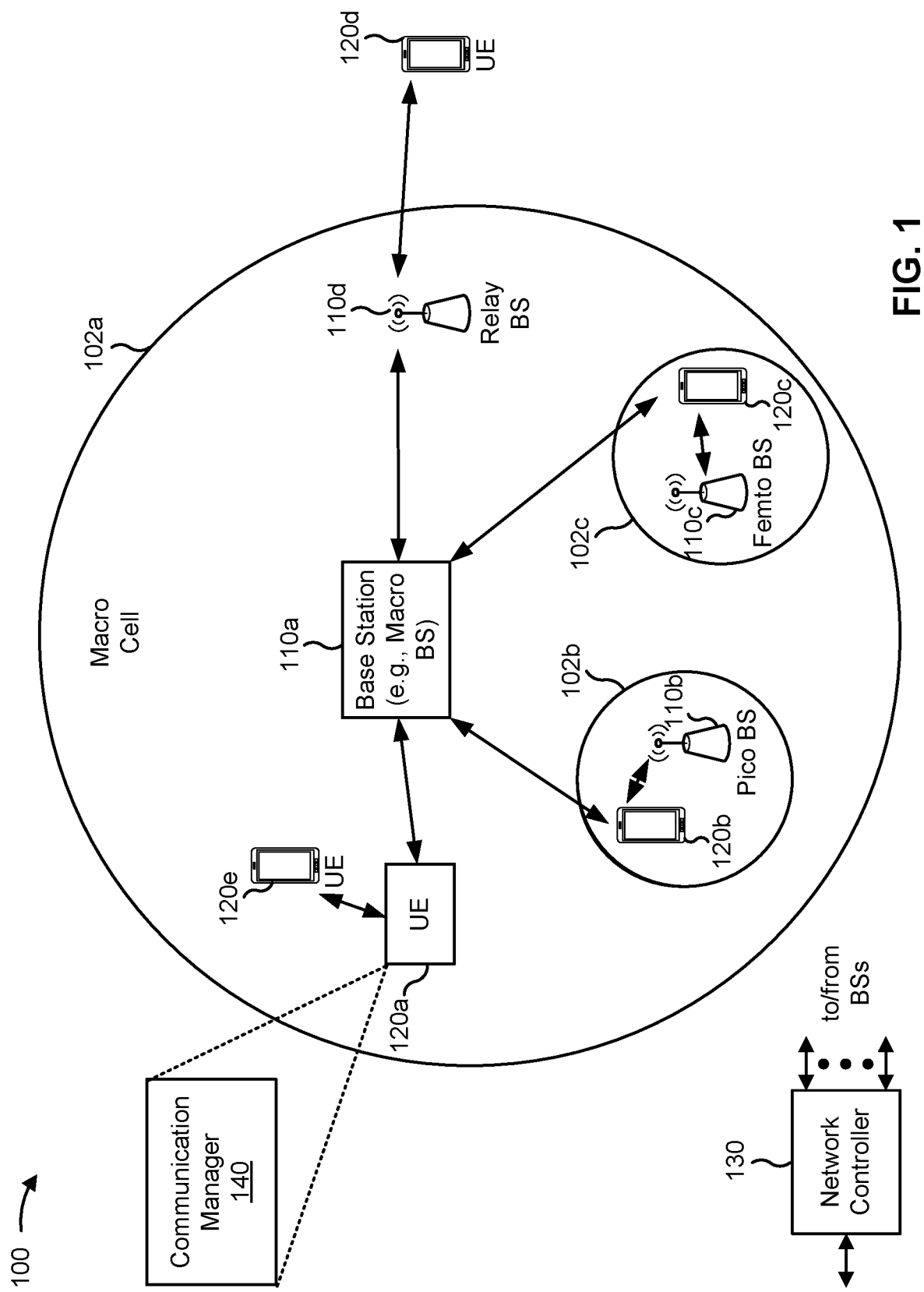
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a UE 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a second UE, sidelink configuration information indicating one or more transmission configuration TCI states for at least one sidelink channel between the first UE and the second UE. In some aspects, the communication manager 140 may receive, from a second UE, sidelink configuration information indicating one or more transmission configuration TCI states for at least one sidelink channel between the first UE and the second UE. Additionally, or alternatively, the communication manager 140 may perform one or more other operations described herein.

As indicated above, FIG. 1 is provided as an example. Other examples may differ from what is described with regard to FIG. 1.

Figure 2:
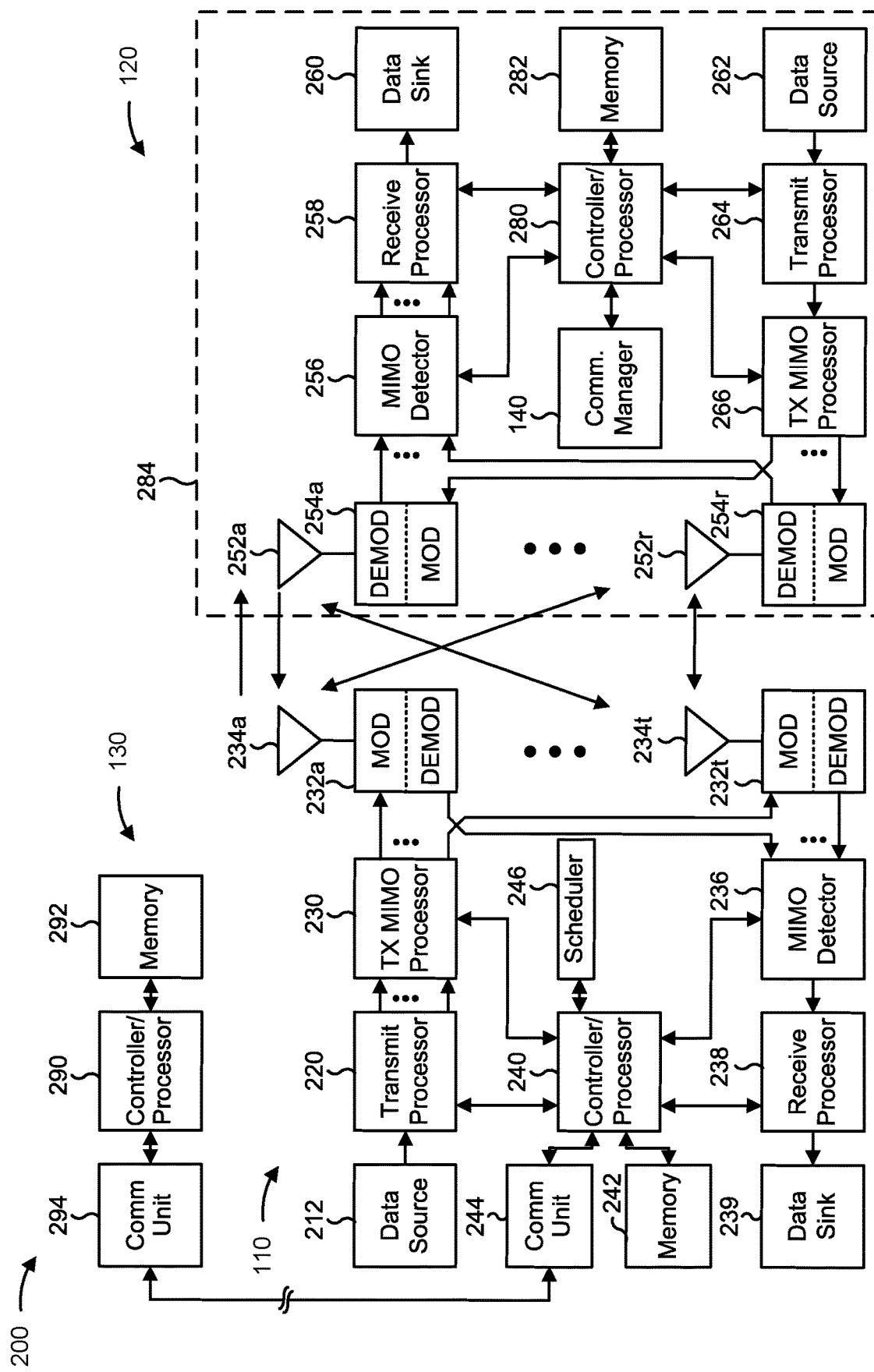
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples.

An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-11).

The controller/processor 240 of the base station 110, the controller/processor 280 of the UE 120, and/or any other component(s) of FIG. 2 may perform one or more techniques associated with configuring sidelink TCI states, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE includes means for transmitting, to another UE, sidelink configuration information indicating one or more TCI states for at least one sidelink channel between the UE and the other UE. In some aspects, the UE includes means for receiving, from another UE, sidelink configuration information indicating one or more TCI states for at least one sidelink channel between the UE and the other UE. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
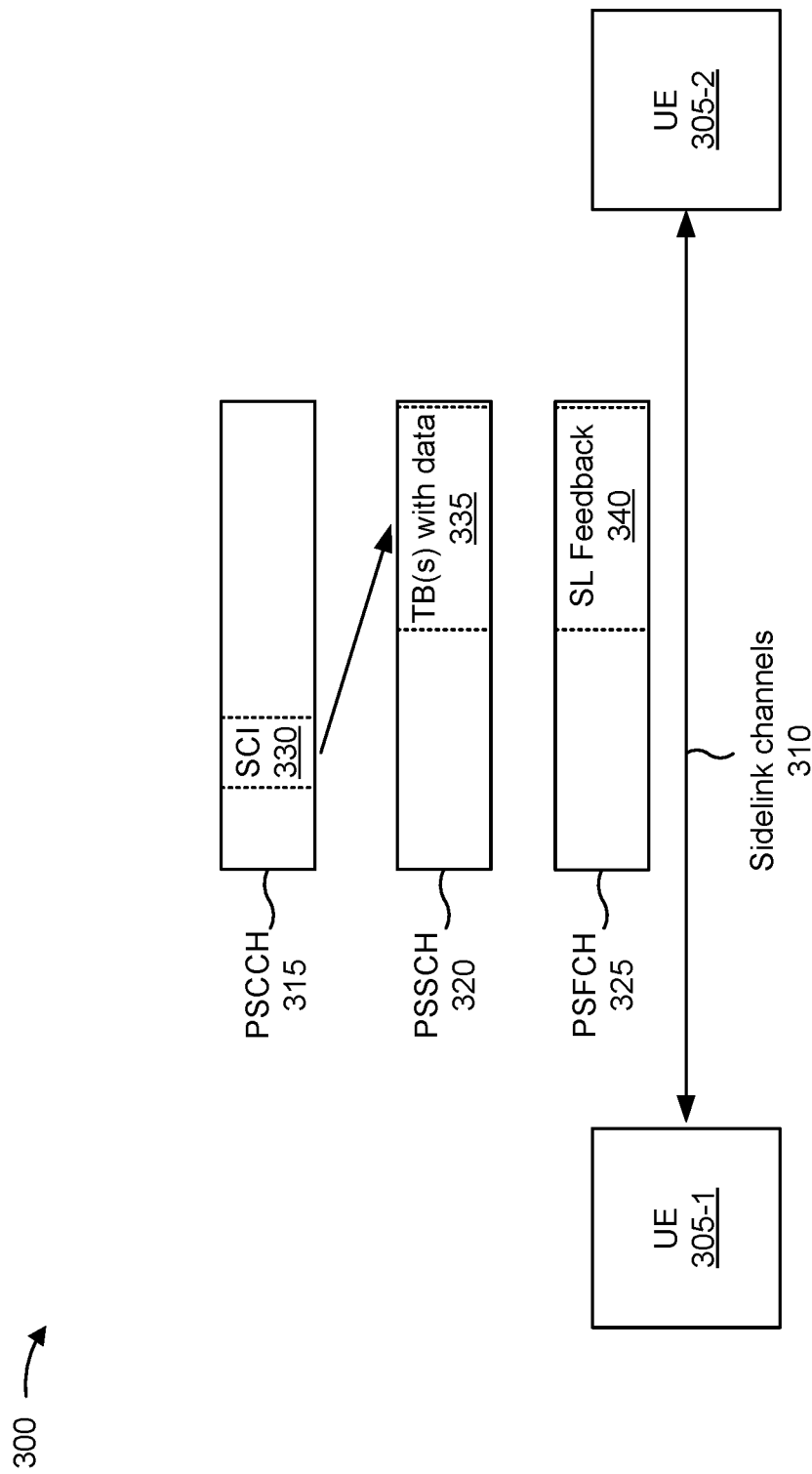
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
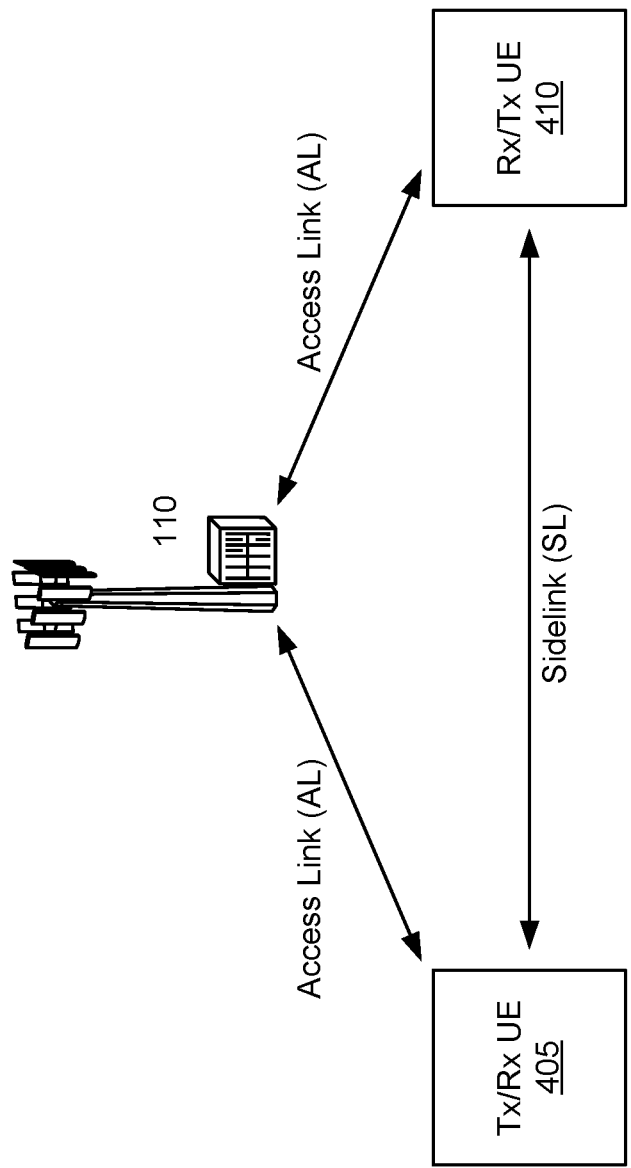
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
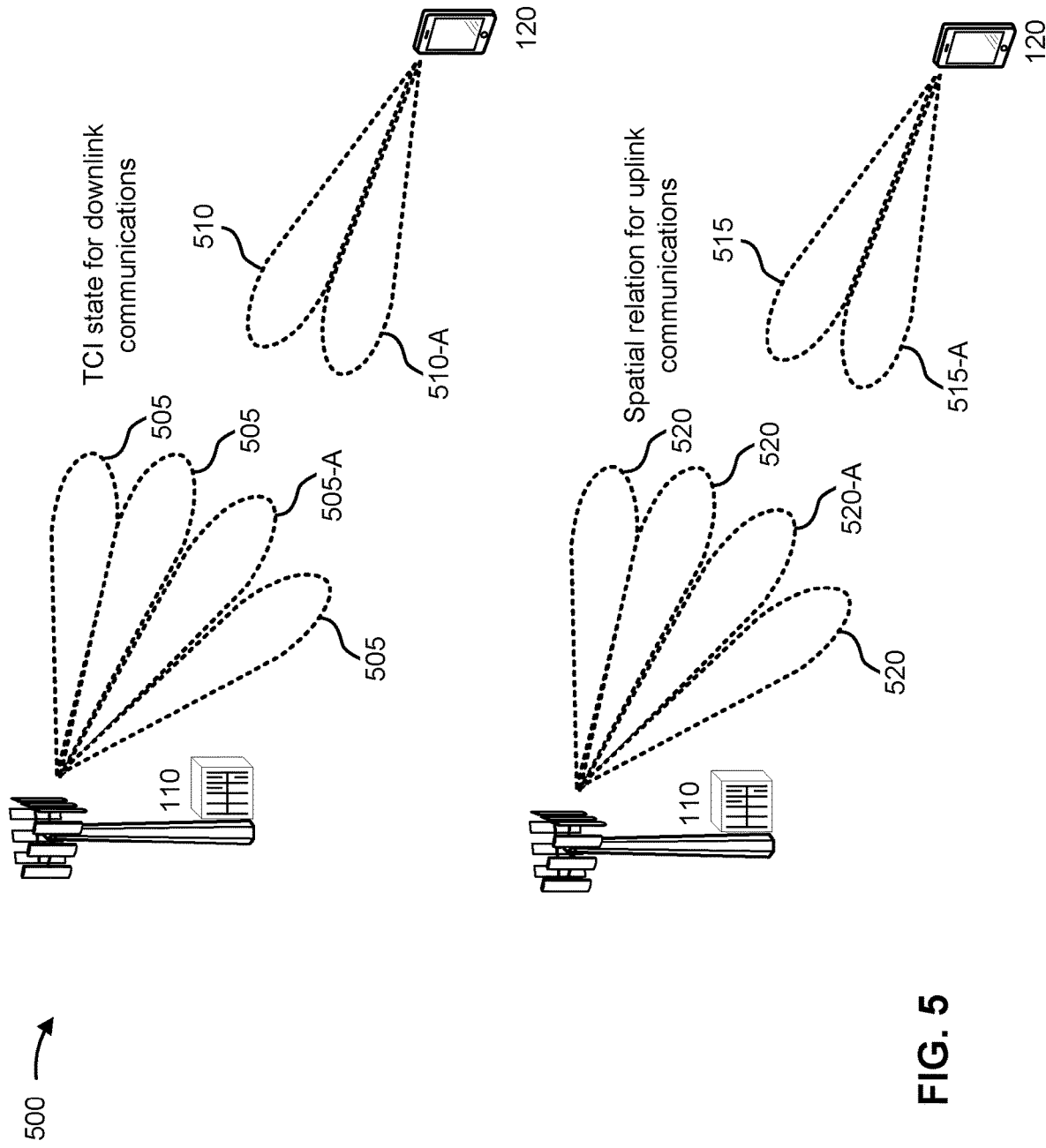
FIG. 5 is a diagram illustrating an example of using beams for communications between a base station and a UE, in accordance with the present disclosure.

FIG. 5 is a diagram illustrating an example 500 of using beams for communications between a base station and a UE, in accordance with the present disclosure. As shown in FIG. 5, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 505.

The UE 120 may attempt to receive downlink transmissions via one or more UE receive beams 510, which may be configured using different beamforming parameters at receive circuitry of the UE 120. The UE 120 may identify a particular BS transmit beam 505, shown as BS transmit beam 505-A, and a particular UE receive beam 510, shown as UE receive beam 510-A, that provide relatively favorable performance (for example, that have a best channel quality of the different measured combinations of BS transmit beams 505 and UE receive beams 510). In some examples, the UE 120 may transmit an indication of which BS transmit beam 505 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 505-A and the UE receive beam 510-A), which may be further refined and maintained in accordance with one or more established beam refinement procedures.

A downlink beam, such as a BS transmit beam 505 or a UE receive beam 510, may be associated with a TCI state. A TCI state may indicate a directionality or a characteristic of the downlink beam, such as one or more quasi co-location (QCL) properties of the downlink beam. A QCL property may include, for example, a Doppler shift, a Doppler spread, an average delay, a delay spread, or spatial receive parameters, among other examples. In some examples, each BS transmit beam 505 may be associated with a synchronization signal block (SSB), and the UE 120 may indicate a preferred BS transmit beam 505 by transmitting uplink transmissions in resources of the SSB that are associated with the preferred BS transmit beam 505. A particular SSB may have an associated TCI state (for example, for an antenna port or for beamforming). The base station 110 may, in some examples, indicate a downlink BS transmit beam 505 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 510 at the UE 120. Thus, the UE 120 may select a corresponding UE receive beam 510 from a set of BPLs based at least in part on the base station 110 indicating a BS transmit beam 505 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a PDSCH. The set of activated TCI states for downlink control channel communications may correspond to beams that the base station 110 may use for downlink transmission on a PDCCH or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 515.

The base station 110 may receive uplink transmissions via one or more BS receive beams 520. The base station 110 may identify a particular UE transmit beam 515, shown as UE transmit beam 515-A, and a particular BS receive beam 520, shown as BS receive beam 520-A, that provide relatively favorable performance (for example, that have a best channel quality of the different measured combinations of UE transmit beams 515 and BS receive beams 520). In some examples, the base station 110 may transmit an indication of which UE transmit beam 515 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 515-A and the BS receive beam 520-A), which may be further refined and maintained in accordance with one or more established beam refinement procedures. An uplink beam, such as a UE transmit beam 515 or a BS receive beam 520, may be associated with a spatial relation. A spatial relation may indicate a directionality or a characteristic of the uplink beam, similar to one or more QCL properties, as described above.

As indicated above, FIG. 5 is provided as an example. Other examples may differ from what is described with respect to FIG. 5.

While TCI state information may facilitate communications between a base station and a UE, UEs communicating via sidelink cannot rely on a base station to provide information regarding sidelink channel conditions sufficient to configure TCI states for UEs communicating via sidelink. Some techniques and apparatuses described herein enable UEs to configure sidelink TCI states, which may facilitate higher quality sidelink communications (e.g., improved BPLs) between sidelink UEs. For example, a first UE may transmit, to a second UE, sidelink configuration information indicating one or more TCI states for a sidelink channel between the first and second UEs, and the second UE may use the TCI states to select one or more beams for sidelink communications with the first UE. In this way, the quality of sidelink communications between UEs may be improved, for example, by reducing signaling that might otherwise be required to determine channel conditions of multiple beams and enabling UEs to more quickly establish BPLs with favorable channel conditions. This may improve spectral efficiency by reducing communications between UEs and also may improve power consumption of sidelink UEs by reducing the number of communications and calculations that might otherwise be required to estimate channel conditions and select BPLs.

Figure 6:
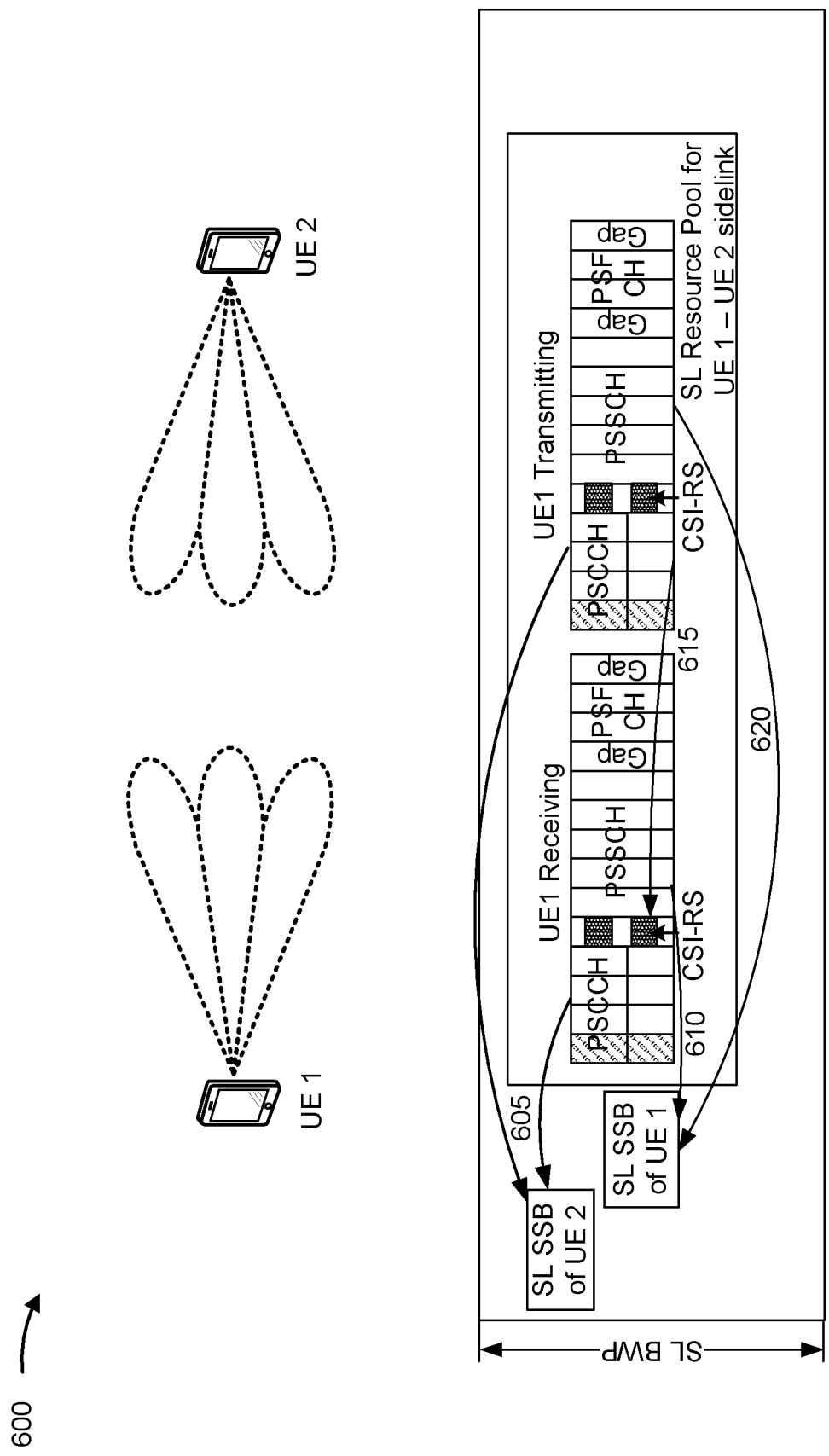
FIG. 6 is a diagram illustrating an example of sidelink beam indicators, in accordance with the present disclosure.

FIG. 6 is a diagram illustrating an example 600 of sidelink beam indicators, in accordance with the present disclosure. As shown in FIG. 6, a first UE (e.g., UE 120, depicted as UE 1) and a second UE (e.g., UE 120, depicted as UE 2) may communicate with one another via sidelink communications, as described herein.

The example 600 includes a depiction of a sidelink bandwidth part (BWP) and a resource pool for the sidelink between UE 1 and UE 2. UE 1 may use one or more transmit beams for transmitting sidelink communications, which UE 2 may receive using one or more receive beams.

As shown by reference number 605, UE 1's Rx beam for PSCCH may be derived from the Rx beam used for receiving UE 2's SSB. As shown by reference number 610, UE 1's Rx beam for PSSCH may be derived from the Tx beam used to transmit SSBs to UE 2. As shown by reference number 615, UE 1's Tx beam for PSSCH can be derived from the Rx beam used to receive UE 2's CSI-RS. As shown by reference number 620, UE1's Tx beam for PSSCH may be derived from the Tx beam used to transmit SSBs to UE 2.

As indicated above, FIG. 6 is provided as an example. Other examples may differ from what is described with respect to FIG. 6.

Figure 7:
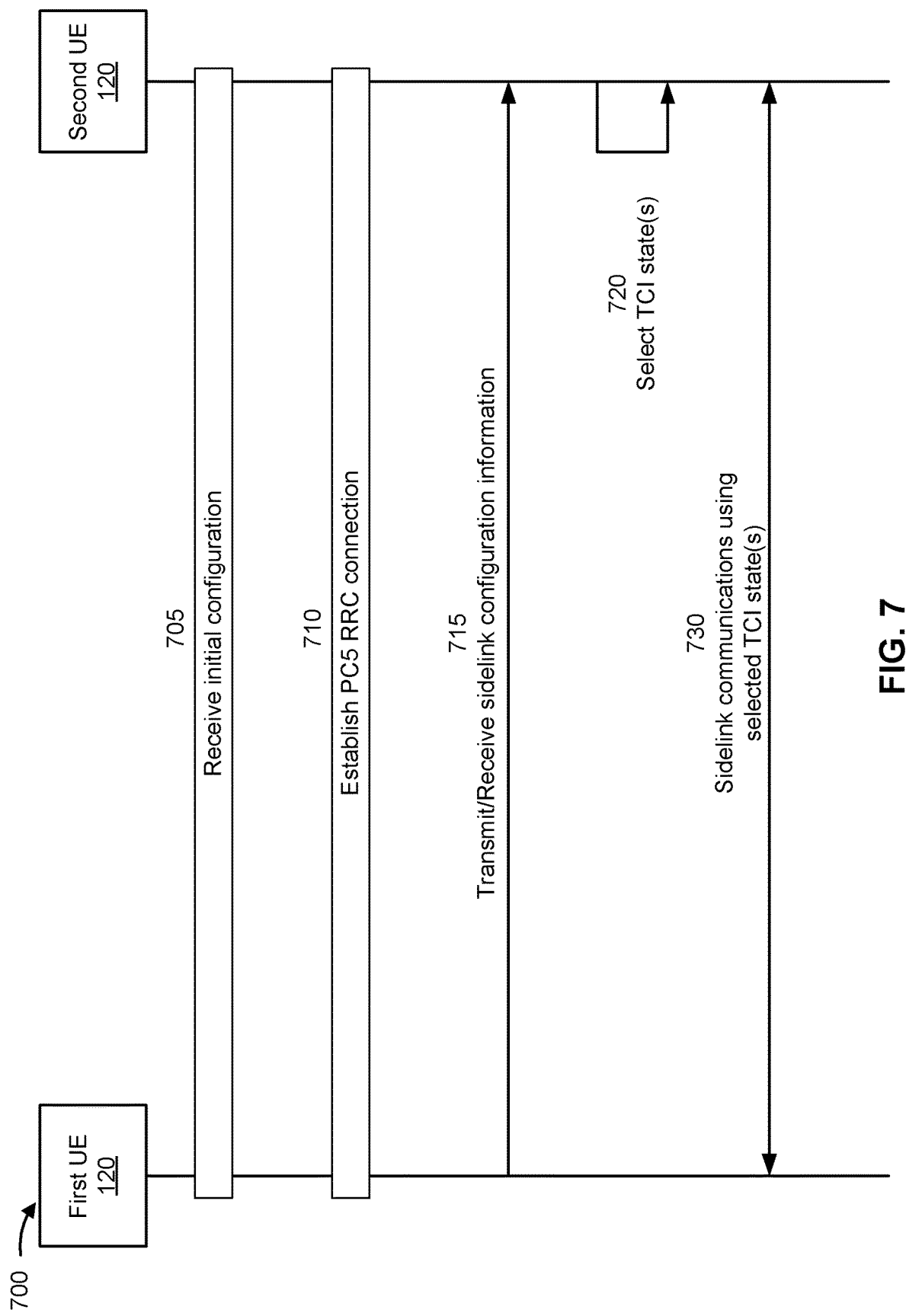
FIG. 7 is a diagram illustrating an example associated with configuring sidelink TCI states, in accordance with the present disclosure.

FIG. 7 is a diagram illustrating an example 700 associated with configuring sidelink TCI states, in accordance with the present disclosure. As shown in FIG. 7, a first UE (e.g., UE 120) and a second UE (e.g., UE 120) 120 may communicate with one another. In some aspects, the first UE and/or the second UE may be included in a wireless network, such as wireless network 100. The first UE and the second UE may communicate via a wireless access link, which may include a sidelink. In some aspects, the first UE may be a Tx UE, and the second UE may be an Rx UE. In some aspects, the first UE may be an Rx UE, and the second UE may be a Tx UE. In some aspects, the first UE and the second UE may communicate using unicast sidelink communications and may operate using a resource allocation mode (e.g., Mode 2) in which resource selection and scheduling for sidelink communications are autonomously performed by the UEs (e.g., rather than a base station).

As shown by reference number 705, the first UE and the second UE may each receive a respective initial configuration. In some aspects, the initial configuration for a UE (e.g., the first UE or the second UE) may include component carriers each associated with one or more services and/or QoS parameters associated with each of one or more services that utilize sidelink communications. In some aspects, the initial configuration may include a list of TCI state configurations that may be used for sidelink communications. In some aspects, the initial configurations for the first UE and the second UE may not be the same. For example, the first UE may receive a first initial configuration, and the second UE may receive a second initial configuration that is different from the first initial configuration.

In some aspects, the first UE and/or the second UE may receive the initial configuration from a base station. In some aspects, the first UE and/or the second UE may be pre-configured with the initial configuration. For example, the first UE and/or the second UE may be pre-configured with the initial configuration by an original equipment manufacturer (OEM), a server (e.g., a V2X server), or a cellular network device, among other examples. In some aspects, the first UE and/or the second UE may begin a service or application, and the first UE and/or the second UE may receive an initial configuration for that service or application from higher layer (e.g., V2X Service layer or Application layer). For example, the initial configuration may include QoS information, sidelink carrier information, and/or sidelink BWP information associated with that service or application on one or more sidelink carriers.

As shown by reference number 710, the first UE may establish a PC5 RRC connection with the second UE. In some aspects, the first UE and the second UE may share UE capability information (e.g., UECapabilityInformationSidelink via sidelink UE capability transfer procedure) when or after establishing the PC5 RRC connection. In some aspects, for the first UE and the second UE, the UE capability information shared with one another may include the capability of the UE to apply TCI states to for sidelink communications.

As shown by reference number 715, the first UE may transmit, and the second UE may receive, sidelink configuration information indicating one or more TCI states. The one or more TCI states may be for at least one sidelink channel (e.g., PSCCH, PSSCH, and/or PSFCH). In some aspects, the sidelink configuration information may be transmitted via RRC signaling. For example, the sidelink configuration information may be indicated in a PC5 RRC message (e.g., a second PC5 RRC message). For example, the PC5 RRC message may be a PC5 RRC reconfiguration message (e.g., RRCReconfigurationSidelink). In some aspects, the sidelink configuration information include multiple TCI states for multiple sidelink channels between the first UE and the second UE (e.g., PSCCH, PSSCH, and/or PSFCH).

In some aspects, the configuration information indicating the one or more TCI states may include a sidelink TCI state identifier that identifies the TCI state and one or more QCL types associated with corresponding sidelink QCL information. For example, a TCI state may be defined by the following sequence:

```
SL-TCI-State:: = SEQUENCE {
    sl-Tci-StateId          SL-TCI-StateId,
    qcl-type1               SL-QCL-Info,
    qcl-type 2              SL-QCL-Info,
    ...
}
```

The contents of the sidelink QCL information (e.g., SL-QCL-Info) may vary. In some aspects, sidelink QCL information may define a serving cell index, a BWP identifier, a reference signal, and/or a QCL type. Additionally, or alternatively, the sidelink QCL information may define at least a portion of an identifier associated with the first UE (e.g., the UE transmitting the sidelink configuration information) and/or data indicating whether the reference signal is for reception or transmission. For example, in sidelink communications, QCL channel characteristics may be relevant for both reception and transmission, and QCL type (e.g., QCL type D) may indicate spatial receiver parameters and/or spatial transmitter parameters.

In some aspects, the sidelink QCL information may be defined by a first sequence, as follows:

```
SL-QCL-Info:: = SEQUENCE {
    cell                    ServCellIndex,
    bwpId                   BWP-Id,
    QCLsourceRSsenderId     x(e.g., 8 or 16) most significant bits of the
Layer 2 ID of the UE sending the QCL reference signal
    reference-signal        CHOICE{
    sl-csi-rs               SL-CSI-RS-ResourceID,
    sl-ssb                  SL-SSB-Index
    },
    qcl-type                ENUMERATED{typeA,
typeB,typeC,typeD},
}
```

In the first sequence, information identifying the UE (e.g., a number of the most significant bits of a Layer 2 identifier) sending the QCL reference signal may be included in the first sequence.

In some aspects, the sidelink QCL information may be defined by a second sequence, as follows:

```
SL-QCL-Info:: = SEQUENCE {
    cell                    ServCellIndex,
    bwpId                   BWP-Id,
    Tx/Rx                   One bit to indicate whether the QCL reference
```

```
signal is Tx or Rx
    reference-signal        CHOICE{
    sl-csi-rs               SL-CSI-RS-ResourceID,
    sl-ssb                  SL-SSB-Index
    },
    qcl-type                ENUMERATED{typeA,
typeB,typeC,typeD},
}
```

In the second sequence, a bit value of 1 for Tx/Rx may indicate the QCL resource reference signal is sent by the first UE, while a bit value of 0 for Tx/Rx may indicate the QCL resource reference signal is received by the first UE (e.g., sent by the second UE).

In some aspects, the sidelink QCL information may be defined by a third sequence, as follows:

```
SL-QCL-Info:: = SEQUENCE {
    cell                    ServCellIndex,
    bwpId                   BWP-Id,
    reference-signal        CHOICE{
    sl-csi-rs               SL-CSI-RS-ResourceID,
    sl-ssb                  SL-SSB-Index
    },
    qcl-type                ENUMERATED{typeA,
typeB,typeC,typeD},
}
```

For example, the third sequence may be used in a situation where the QCL source reference signal is always the Rx reference signal.

As shown by reference number 720, the second UE may select, based at least in part on the one or more TCI states transmitted by the first UE, at least one beam for sidelink communications with the first UE. In some aspects, the second UE may have one or more antenna configurations for the at least one beam based at least in part on the one or more TCI states, as described herein. In some aspects, the UE may reconfigure antennas or antenna weighting configurations associated with the at least one beam based at least in part on the one or more TCI states, as described herein.

As shown by reference number 730, the first UE and the second UE may communicate with another, via sidelink communications using the selected TCI state(s). For example, the first UE and the second UE may use one or more BPLs, selected based at least in part on the TCI state(s), for communicating via PSCCH, PSSCH, and/or PSFCH.

As indicated above, FIG. 7 is provided as an example. Other examples may differ from what is described with respect to FIG. 7.

Figure 8:
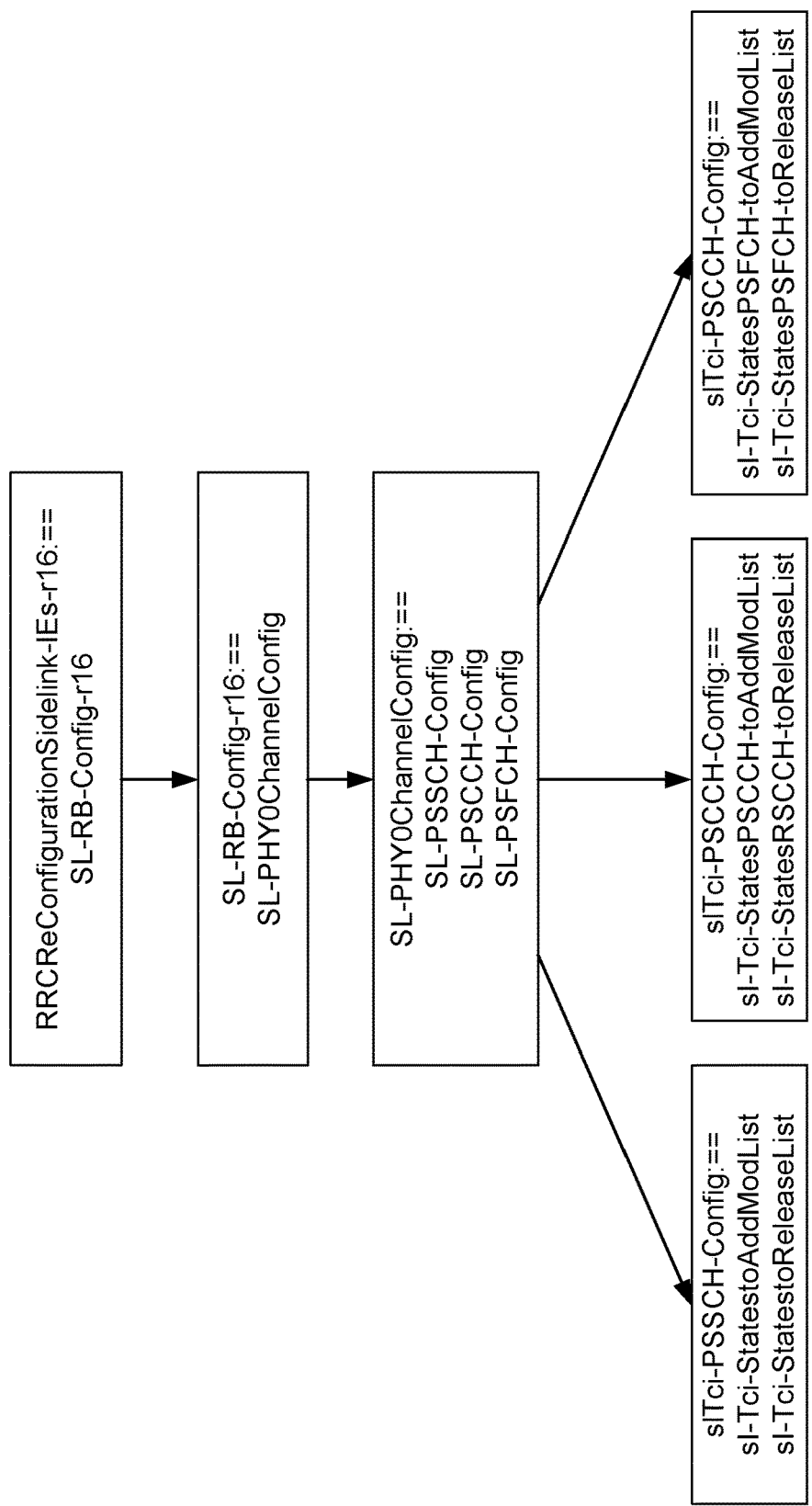
FIG. 8 is a diagram illustrating an example associated with sidelink transmission configuration indicator (TCI) state configurations, in accordance with the present disclosure.

FIG. 8 is a diagram illustrating an example 800 associated with sidelink TCI state configurations, in accordance with the present disclosure. As shown in FIG. 8, RRCReConfigurationSidelink may be used to configure TCI states for sidelink communications (e.g., between UEs, such as UE 120).

In some aspects, as shown in example 800, each physical channel may be associated with a TCI state configuration. For example, PSSCH, PSCCH, and PSFCH may each be associated with separate TCI state configurations, including configuration parameters that enable TCI states to be added and/or released from a current TCI state configuration of a UE. In some aspects, separate configurations for PSCCH and PSSCH may only be used when introducing time gaps between PSCCH and PSSCH; otherwise, they may be configured with the same TCI states.

In some aspects, example parameters associated with RRCReConfigurationSidelink may include:
  sl-Tci-StatesToAddModList
    SEQUENCE (SIZE(1 . . . maxNrofSLTCI-States)) OF SL-TCI-State
  sl-Tci-StatesToReleaseList
    SEQUENCE (SIZE(1 . . . maxNrofTCI-States)) OF SL-TCI-StateId
  sl-Tci-States-PSCCH(PSFCH)-ToAddList
    SEQUENCE (SIZE(1 . . . maxNrofTCI-States)) OF SL-TCI-StateId
  sl-Tci-States-PSCCH(PSFCH)-ToReleaseList
    SEQUENCE (SIZE(1 . . . maxNrofTCI-States)) OF SL-TCI-StateId The foregoing configuration parameters may enable a UE to add and/or release up to a maximum number of TCI states (e.g., maxNrofTCI-States) for the different sidelink channels (e.g., PSSCH, PSCCH, and/or PSFCH).

In some aspects, TCI states may be configured separately for Tx and Rx. In this case, each configuration parameter may be associated with either Tx or Rx (e.g., sl-Tci-States-PSxCH-Tx-ToAddList and Tci-States-PSxCH-Rx-ToAddList, where x=C, S, or F). In some aspects, the TCI states for a particular sidelink channel (e.g., PSSCH, PSCCH, and/or PSFCH) may be configured using a union of Tx TCI states and Rx TCI states. For example, TCI states for PSSCH Rx may be combined with TCI states of PSSCH Tx, and the same TCI states may be used for both Rx and Tx.

As indicated above, FIG. 8 is provided as an example. Other examples may differ from what is described with respect to FIG. 8.

FIG. 9 is a diagram illustrating an example process 900 performed, for example, by a first UE, in accordance with the present disclosure. Example process 900 is an example where the UE (e.g., UE 120) performs operations associated with configuring sidelink transmission configuration.

As shown in FIG. 9, in some aspects, process 900 may include transmitting, to a second UE, sidelink configuration information indicating one or more TCI states for at least one sidelink channel between the first UE and the second UE (block 910). For example, the UE (e.g., using communication manager 140 and/or transmission component 1104, depicted in FIG. 11) may transmit, to a second UE, sidelink configuration information indicating one or more TCI states for at least one sidelink channel between the first UE and the second UE, as described above.

Process 900 may include additional aspects, such as any single aspect or any combination of aspects described below and/or in connection with one or more other processes described elsewhere herein.

In a first aspect, the at least one sidelink channel is a physical sidelink control channel.

In a second aspect, alone or in combination with the first aspect, the at least one sidelink channel is a physical sidelink shared channel.

In a third aspect, alone or in combination with one or more of the first and second aspects, the at least one sidelink channel is a physical sidelink feedback channel.

In a fourth aspect, alone or in combination with one or more of the first through third aspects, the sidelink configuration information indicates a plurality of TCI states for a plurality of sidelink channels between the first UE and the second UE.

In a fifth aspect, alone or in combination with one or more of the first through fourth aspects, a TCI state, of the one or more TCI states, defines a serving cell index, a bandwidth part identifier, a reference signal, and a QCL type.

In a sixth aspect, alone or in combination with one or more of the first through fifth aspects, the TCI state further defines at least one of at least a portion of an identifier associated with the first UE, or data indicating whether the reference signal is for reception or transmission.

In a seventh aspect, alone or in combination with one or more of the first through sixth aspects, transmitting the sidelink configuration information comprises transmitting the sidelink configuration information via radio resource control signaling.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
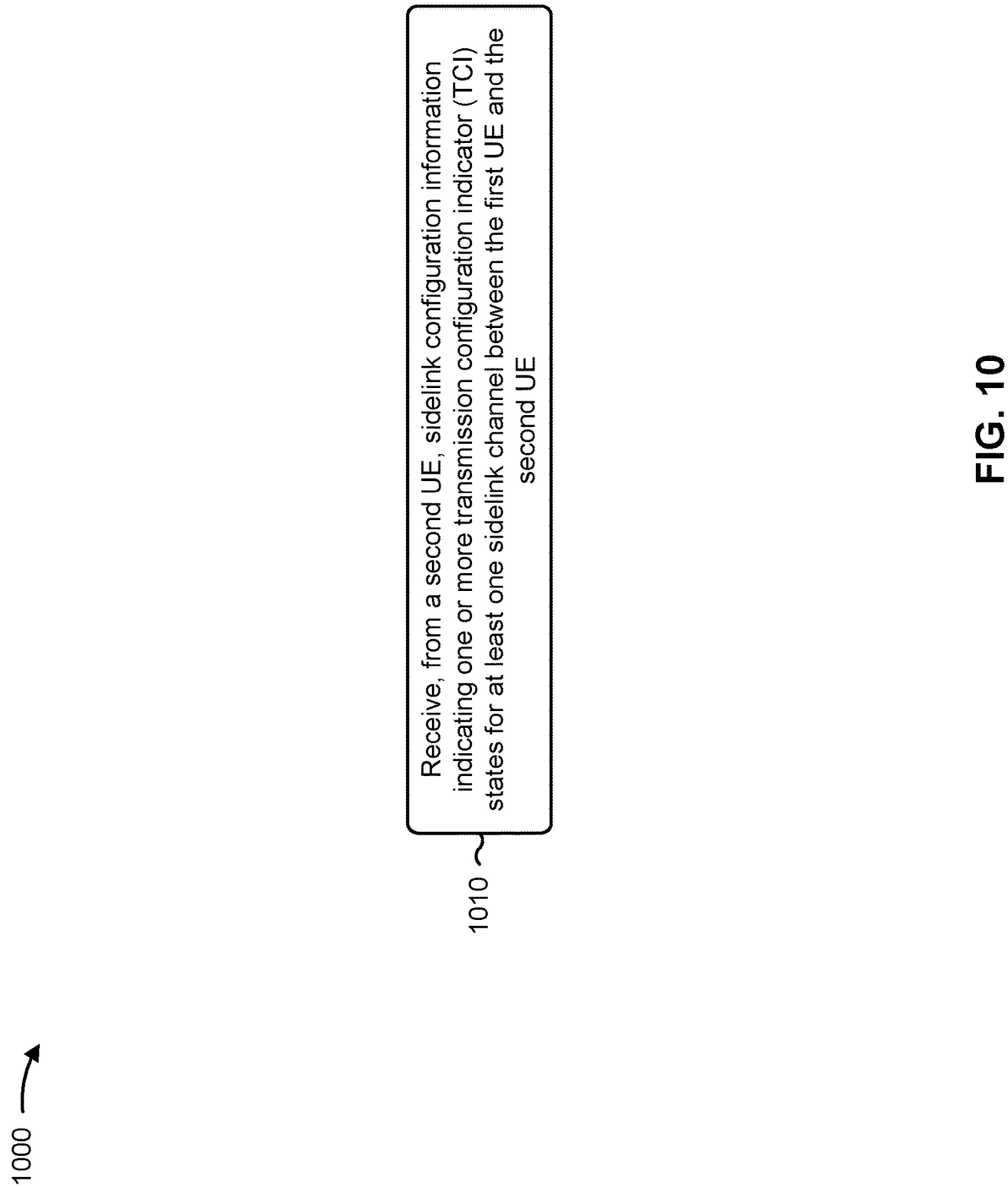

FIG. 10 is a diagram illustrating an example process 1000 performed, for example, by a UE, in accordance with the present disclosure. Example process 1000 is an example where the UE (e.g., UE 120) performs operations associated with configuring sidelink transmission configuration.

As shown in FIG. 10, in some aspects, process 1000 may include receiving, from a second UE, sidelink configuration information indicating one or more TCI states for at least one sidelink channel between the first UE and the second UE (block 1010). For example, the UE (e.g., using communication manager 140 and/or reception component 1102, depicted in FIG. 11) may receive, from a second UE, sidelink configuration information indicating one or more TCI states for at least one sidelink channel between the first UE and the second UE, as described above.

Process 1000 may include additional aspects, such as any single aspect or any combination of aspects described below and/or in connection with one or more other processes described elsewhere herein.

In a first aspect, the at least one sidelink channel is a physical sidelink control channel.

In a second aspect, alone or in combination with the first aspect, the at least one sidelink channel is a physical sidelink shared channel.

In a third aspect, alone or in combination with one or more of the first and second aspects, the at least one sidelink channel is a physical sidelink feedback channel.

In a fourth aspect, alone or in combination with one or more of the first through third aspects, the sidelink configuration information indicates a plurality of TCI states for a plurality of sidelink channels between the first UE and the second UE.

In a fifth aspect, alone or in combination with one or more of the first through fourth aspects, a TCI state, of the one or more TCI states, defines a serving cell index, a bandwidth part identifier, a reference signal, and a QCL type.

In a sixth aspect, alone or in combination with one or more of the first through fifth aspects, the TCI state further defines at least one of at least a portion of an identifier associated with the second UE, or data indicating whether the reference signal is for reception or transmission.

In a seventh aspect, alone or in combination with one or more of the first through sixth aspects, receiving the sidelink configuration information comprises receiving the sidelink configuration information via radio resource control signaling.

In an eighth aspect, alone or in combination with one or more of the first through seventh aspects, process 1000 includes selecting, based at least in part on the one or more TCI states, at least one beam for sidelink communications with the second UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
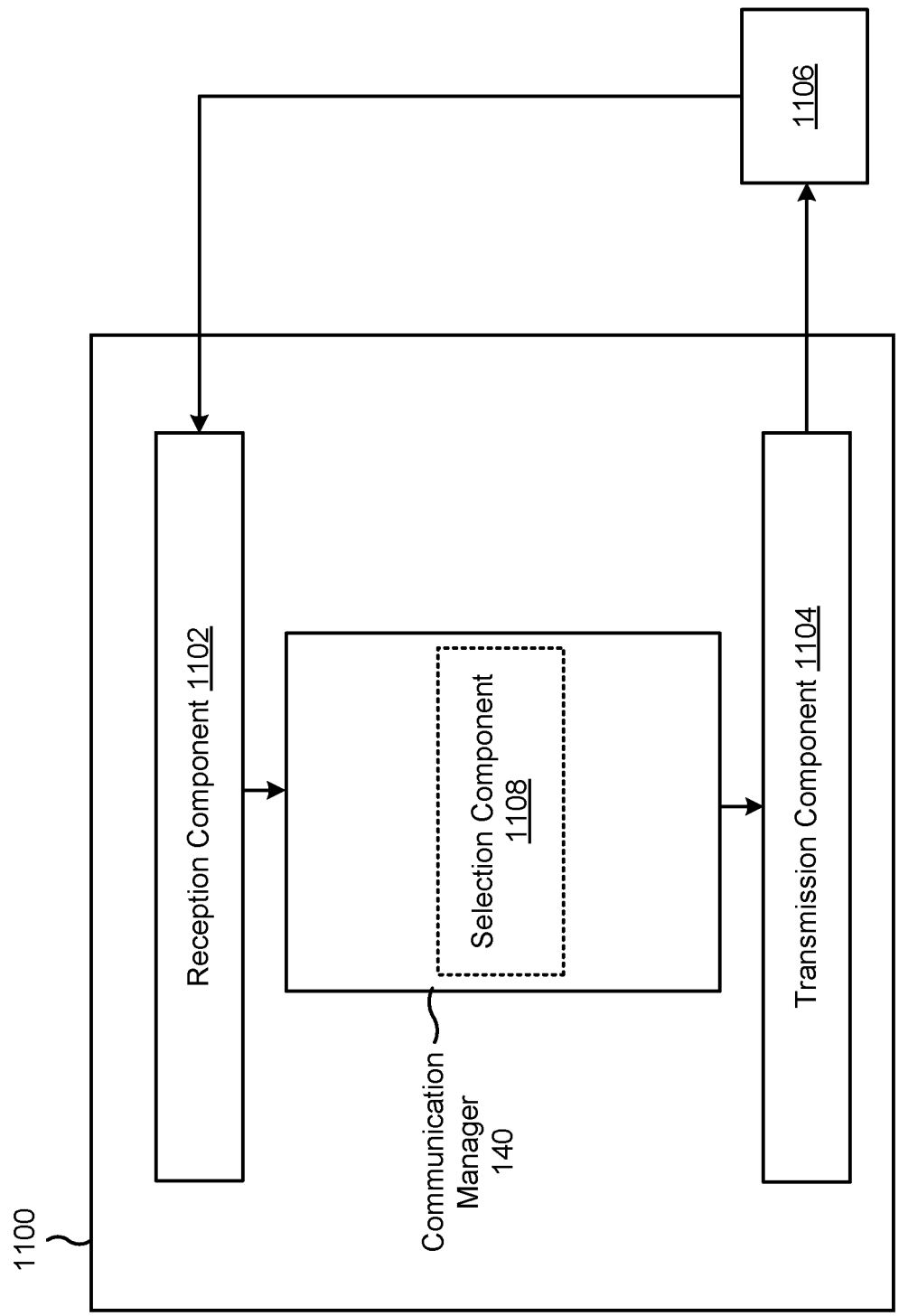
FIG. 11 is a diagram of an example apparatus for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a selection component 1108, among other examples.

In some aspects, the apparatus 1100 may be configured to perform one or more operations described herein in connection with FIGS. 3-8. Additionally, or alternatively, the apparatus 1100 may be configured to perform one or more processes described herein, such as process 900 of FIG. 9, process 1000 of FIG. 10, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The transmission component 1104 may transmit, to a second UE, sidelink configuration information indicating one or more TCI states for at least one sidelink channel between the first UE and the second UE.

The reception component 1102 may receive, from a second UE, sidelink configuration information indicating one or more TCI states for at least one sidelink channel between the first UE and the second UE.

The selection component 1108 may select, based at least in part on the one or more TCI states, at least one beam for sidelink communications with the second UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a first UE, comprising: transmitting, to a second UE, sidelink configuration information indicating one or more TCI states for at least one sidelink channel between the first UE and the second UE.

Aspect 2: The method of Aspect 1, wherein the at least one sidelink channel is a physical sidelink control channel.

Aspect 3: The method of any of Aspects 1-2, wherein the at least one sidelink channel is a physical sidelink shared channel.

Aspect 4: The method of any of Aspects 1-3, wherein the at least one sidelink channel is a physical sidelink feedback channel.

Aspect 5: The method of any of Aspects 1-4, wherein the sidelink configuration information indicates a plurality of TCI states for a plurality of sidelink channels between the first UE and the second UE.

Aspect 6: The method of any of Aspects 1-5, wherein a TCI state, of the one or more TCI states, defines: a serving cell index, a bandwidth part identifier, a reference signal, and a QCL type.

Aspect 7: The method of Aspect 6, wherein the TCI state further defines at least one of: at least a portion of an identifier associated with the first UE, or data indicating whether the reference signal is for reception or transmission.

Aspect 8: The method of any of Aspects 1-7, wherein transmitting the sidelink configuration information comprises: transmitting the sidelink configuration information via radio resource control signaling.

Aspect 9: A method of wireless communication performed by a first UE, comprising: receiving, from a second UE, sidelink configuration information indicating one or more TCI states for at least one sidelink channel between the first UE and the second UE.

Aspect 10: The method of Aspect 9, wherein the at least one sidelink channel is a physical sidelink control channel.

Aspect 11: The method of any of Aspects 9-10, wherein the at least one sidelink channel is a physical sidelink shared channel.

Aspect 12: The method of any of Aspects 9-11, wherein the at least one sidelink channel is a physical sidelink feedback channel.

Aspect 13: The method of any of Aspects 9-12, wherein the sidelink configuration information indicates a plurality of TCI states for a plurality of sidelink channels between the first UE and the second UE.

Aspect 14: The method of any of Aspects 9-13, wherein a TCI state, of the one or more TCI states, defines: a serving cell index, a bandwidth part identifier, a reference signal, and a QCL type.

Aspect 15: The method of Aspect 14, wherein the TCI state further defines at least one of: at least a portion of an identifier associated with the second UE, or data indicating whether the reference signal is for reception or transmission.

Aspect 16: The method of any of Aspects 9-15, wherein receiving the sidelink configuration information comprises: receiving the sidelink configuration information via radio resource control signaling.

Aspect 17: The method of any of Aspects 9-16, further comprising: selecting, based at least in part on the one or more TCI states, at least one beam for sidelink communications with the second UE.

Aspect 18: An apparatus for wireless communication at a device, comprising a processor; memory coupled with the processor; and instructions stored in the memory and executable by the processor to cause the apparatus to perform the method of one or more of Aspects 1-8.

Aspect 19: An apparatus for wireless communication at a device, comprising a processor; memory coupled with the processor; and instructions stored in the memory and executable by the processor to cause the apparatus to perform the method of one or more of Aspects 9-17.

Aspect 20: A device for wireless communication, comprising a memory and one or more processors coupled to the memory, the one or more processors configured to perform the method of one or more of Aspects 1-8.

Aspect 21: A device for wireless communication, comprising a memory and one or more processors coupled to the memory, the one or more processors configured to perform the method of one or more of Aspects 9-17.

Aspect 22: An apparatus for wireless communication, comprising at least one means for performing the method of one or more of Aspects 1-8.

Aspect 23: An apparatus for wireless communication, comprising at least one means for performing the method of one or more of Aspects 9-17.

Aspect 24: A non-transitory computer-readable medium storing code for wireless communication, the code comprising instructions executable by a processor to perform the method of one or more of Aspects 1-8.

Aspect 25: A non-transitory computer-readable medium storing code for wireless communication, the code comprising instructions executable by a processor to perform the method of one or more of Aspects 9-17.

Aspect 26: A non-transitory computer-readable medium storing a set of instructions for wireless communication, the set of instructions comprising one or more instructions that, when executed by one or more processors of a device, cause the device to perform the method of one or more of Aspects 1-8.

Aspect 27: A non-transitory computer-readable medium storing a set of instructions for wireless communication, the set of instructions comprising one or more instructions that, when executed by one or more processors of a device, cause the device to perform the method of one or more of Aspects 9-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
   one or more memories; and
   one or more processors, coupled to the one or more memories, configured to:
      transmit, to a second UE, sidelink configuration information indicating one or more transmission configuration indicator (TCI) states for at least one sidelink channel between the first UE and the second UE, wherein a TCI state, of the one or more TCI states, defines sidelink quasi co-location (QCL) information that identifies a sender of a QCL reference signal, and wherein the sidelink QCL information that identifies the sender of the QCL reference signal includes at least one of:
         at least a portion of an identifier associated with the first UE, or
         data indicating whether the QCL reference signal is for reception or transmission; and
      communicate, using the indicated one or more TCI states, the QCL reference signal with the second UE.

2. The first UE of claim 1, wherein the at least one sidelink channel is a physical sidelink control channel.

3. The first UE of claim 1, wherein the at least one sidelink channel is a physical sidelink shared channel.

4. The first UE of claim 1, wherein the at least one sidelink channel is a physical sidelink feedback channel.

5. The first UE of claim 1, wherein the sidelink configuration information indicates a plurality of TCI states for a plurality of sidelink channels between the first UE and the second UE.

6. The first UE of claim 1, wherein a TCI state, of the one or more TCI states, defines:
   a serving cell index,
   a bandwidth part identifier,
   a type of the QCL reference signal, and
   a QCL type.

7. The first UE of claim 1, wherein the one or more processors, to transmit the sidelink configuration information, are configured to:
   transmit the sidelink configuration information via radio resource control signaling.

8. The first UE of claim 1, wherein the one or more processors, to communicate the QCL reference signal with the second UE, are configured to:
   receive the QCL reference signal from the second UE, or
   transmit the QCL reference signal to the second UE.

9. A first user equipment (UE) for wireless communication, comprising:
   one or more memories; and
   one or more processors, coupled to the one or more memories, configured to:
      receive, from a second UE, sidelink configuration information indicating one or more transmission configuration indicator (TCI) states for at least one sidelink channel between the first UE and the second UE, wherein a TCI state, of the one or more TCI states, defines sidelink quasi co-location (QCL) information that identifies a sender of a QCL reference signal, and wherein the sidelink QCL information that identifies the sender of the QCL reference signal includes at least one of:
  at least a portion of an identifier associated with the second UE, or
  data indicating whether the QCL reference signal is for reception or transmission; and
communicate, using the indicated one or more TCI states, the QCL reference signal with the second UE.

10. The first UE of claim 9, wherein the at least one sidelink channel is a physical sidelink control channel.

11. The first UE of claim 9, wherein the at least one sidelink channel is a physical sidelink shared channel.

12. The first UE of claim 9, wherein the at least one sidelink channel is a physical sidelink feedback channel.

13. The first UE of claim 9, wherein the sidelink configuration information indicates a plurality of TCI states for a plurality of sidelink channels between the first UE and the second UE.

14. The first UE of claim 9, wherein a TCI state, of the one or more TCI states, defines:
  a serving cell index,
  a bandwidth part identifier,
  a type of the QCL reference signal, and
  a QCL type.

15. The first UE of claim 9, wherein the one or more processors, to receive the sidelink configuration information, are configured to:
  receive the sidelink configuration information via radio resource control signaling.

16. The first UE of claim 9, wherein the one or more processors are further configured to:
  select, based at least in part on the one or more TCI states, at least one beam for sidelink communications with the second UE.

17. The first UE of claim 9, wherein the one or more processors, to communicate the QCL reference signal with the second UE, are configured to:
  receive the QCL reference signal from the second UE, or
  transmit the QCL reference signal to the second UE.

18. A method of wireless communication performed by a first user equipment (UE), comprising:
  transmitting, to a second UE, sidelink configuration information indicating one or more transmission configuration indicator (TCI) states for at least one sidelink channel between the first UE and the second UE, wherein a TCI state, of the one or more TCI states, defines sidelink quasi co-location (QCL) information that identifies a sender of a QCL reference signal, and wherein the sidelink QCL information that identifies the sender of the QCL reference signal includes at least one of:
    at least a portion of an identifier associated with the first UE, or
    data indicating whether the QCL reference signal is for reception or transmission; and
  communicating, using the indicated one or more TCI states, the QCL reference signal with the second UE.

19. The method of claim 18, wherein the at least one sidelink channel is one of:
  a physical sidelink control channel,
  a physical sidelink shared channel, or
  a physical sidelink feedback channel.

20. The method of claim 18, wherein the sidelink configuration information indicates a plurality of TCI states for a plurality of sidelink channels between the first UE and the second UE.

21. The method of claim 18, wherein a TCI state, of the one or more TCI states, defines:
  a serving cell index,
  a bandwidth part identifier,
  a type of the QCL reference signal, and
  a QCL type.

22. The method of claim 18, wherein transmitting the sidelink configuration information comprises:
  transmitting the sidelink configuration information via radio resource control signaling.

23. The method of claim 18, wherein communicating the QCL reference signal with the second UE comprises:
  receiving the QCL reference signal from the second UE, or
  transmitting the QCL reference signal to the second UE.

24. A method of wireless communication performed by a first user equipment (UE), comprising:
  receiving, from a second UE, sidelink configuration information indicating one or more transmission configuration indicator (TCI) states for at least one sidelink channel between the first UE and the second UE, wherein a TCI state, of the one or more TCI states, defines sidelink quasi co-location (QCL) information that identifies a sender of a QCL reference signal, and wherein the sidelink QCL information that identifies the sender of the QCL reference signal includes at least one of:
    at least a portion of an identifier associated with the second UE, or
    data indicating whether the QCL reference signal is for reception or transmission; and
  communicating, using the indicated one or more TCI states, the QCL reference signal with the second UE.

25. The method of claim 24, wherein the at least one sidelink channel is one of:
  a physical sidelink control channel,
  a physical sidelink shared channel, or
  a physical sidelink feedback channel.

26. The method of claim 24, wherein the sidelink configuration information indicates a plurality of TCI states for a plurality of sidelink channels between the first UE and the second UE.

27. The method of claim 24, wherein a TCI state, of the one or more TCI states, defines:
  a serving cell index,
  a bandwidth part identifier,
  a type of the QCL reference signal, and
  a QCL type.

28. The method of claim 24, wherein receiving the sidelink configuration information comprises:
  receiving the sidelink configuration information via radio resource control signaling.

29. The method of claim 24, further comprising:
  selecting, based at least in part on the one or more TCI states, at least one beam for sidelink communications with the second UE.

30. The method of claim 24, wherein communicating the QCL reference signal with the second UE comprises:
  receiving the QCL reference signal from the second UE, or
  transmitting the QCL reference signal to the second UE.

* * * * *